United States Patent [19]

Valley

[11] Patent Number: 5,676,376
[45] Date of Patent: Oct. 14, 1997

[54] COMPOSITE GAMING CHIP

[75] Inventor: Harold J. Valley, Fountain Valley, Calif.

[73] Assignee: Modern Faucet Mfg. Co., Los Angeles, Calif.

[21] Appl. No.: 738,870

[22] Filed: Oct. 28, 1996

[51] Int. Cl.$^6$ .................................. A63F 3/00; G09F 3/02
[52] U.S. Cl. ................. 273/288; 473/588; 273/148 R; 40/27.5
[58] Field of Search .......................... 273/353, 148 R, 273/288, 290; 40/27.5; D21/53; 473/588

[56] References Cited

U.S. PATENT DOCUMENTS

| | | | |
|---|---|---|---|
| 613,723 | 11/1898 | Richardson | 40/27.5 |
| 3,953,932 | 5/1976 | Graves | 40/27.5 |
| 4,827,640 | 5/1989 | Jones | 40/27.5 |
| 5,166,502 | 11/1992 | Rendleman et al. | 40/27.5 |
| 5,211,403 | 5/1993 | Ostrander | 273/288 |

*Primary Examiner*—William M. Pierce
*Attorney, Agent, or Firm*—Lackenbach Siegel Marzullo Aronson & Greenspan, P.C.

[57] ABSTRACT

A composite gaming chip which includes a strong frame made of a brass ring with axial protrusions and a central aperature with notches. A display or electronic transponder is situated between two clear polycarbonate disks each having a recessed face surrounded by a rim. Tabs radially extending from each disk engage the notches in the brass ring. The assembly is inserted into the cavity of a plastic injection mold where it is bonded together by an injected thermoplastic. The gaming chip can be ground flat without scratching the clear recessed face of either disk.

19 Claims, 8 Drawing Sheets

COMPOSITE GAMING CHIP

BACKGROUND OF THE INVENTION

The subject invention generally pertains to gaming chips, and more specifically to a gaming chip assembly having one or more inserts molded in place on a metallic substrate.

DESCRIPTION OF RELATED ART

This invention is of particular advantage in the production of chips commonly referred to as poker or casino chips. Casino chips are commonly used in games of chance and there is a wide variety of gaming chip assemblies. Different denominations are often marked with different color schemes and design characteristics, allowing both casino employees and game players to readily discern chip values.

It is necessary that the visual characteristics of a chip are both permanent and complex enough so as to avoid counterfeiting. The problem of chip counterfeiting or substitution has been continuous in various establishments where chips are used in the normal conduct of business to represent various monetary or purchasing values. In such environments the use of standard chips which are of simple construction has not been practical.

Several common methods of forming gaming chips with definite designs on one or both surfaces presently exist. In addition to counterfeitability, the designs attempt to address several other concerns such as wear resistance, stackability, ascetics, weight, balance, cost, anti-theft and tamperproof. However, with so many concerns, some are overlooked or designs result in unnecessary compromises.

In particular, the chip described in U.S. Pat. No. 5,166,502 is especially susceptible to tampering and counterfeiting. Its top cover (26) is simply an exposed adhesive label. The label is recessed, but it has no transparent cover to protect it or lock it in place. From an ascetics standpoint, the '502 chip has no tabs to establish the rotational alignment of its top cover with its peripheral protrusions (18).

Similarly, the chip disclosed in U.S. Pat. No. 3,953,932 also includes a center piece (28) that is simply bonded with adhesive or ultrasonic vibrations. The face of the center piece is fully exposed and has no transparent protective cover. And there are no rotational alignment tabs for ensuring that the "Sands Hotel" message is properly aligned to any other feature of the chip.

One current practice in the production of poker or casino chips is the placement of identifiable marks on a plastic chip either during the molding operation or subsequent thereto. Since single-layer chips are easily altered or reproduced, they are often not satisfactory.

Another identifying technique includes adding paper or plastic disks to the top and bottom surfaces of the chip. These disks are normally marked with various indicia which will reflect the value or origination of the chip. It is often possible to remove these disks and substitute counterfeit disks in order to increase their face value.

Multi-layered chips or coins have been used which incorporate a paper disk, inscribed and/or colored, and adhesively secured between transparent layers of a secondary material.

One of the preferred methods used today to prevent counterfeiting is to mold the chip in a first color and then to provide different colored sections along the edge of the chip, identifying the value of the chip even when stacked. Each denomination of chip has a unique color combination. Wedges are removed from a previously molded chip, after which other wedges of a different colored material are secured in the cutout portions of the chip. Counterfeiting is again a problem as the colored wedges of the chip can be removed and replaced with other sections of a different color.

Silk screening and hot stamping, as post-molding operations, have been employed for facilitating the identity of particular chips.

Some other examples of the prior art include Ser. Nos. 478,304 to Alvord and 447,556 to Beyer; and U.S. Pat. Nos. 2,298,365 to Celts et al; 2,544,140 to Dofson et al; and D. 150,099 to Taylor et al.

Another method for making casino chips uses a disc which has projections representing a casino logo and the denominational value of the token. A molding compound is formed over the disc which allows the projecting indicia to extend to the outer edge of the disc.

Still another method is disclosed in U.S. Pat. No. 3,968,582 (Jones). This method uses two rings having offsets and indentations in an aligned manner to form one interlocking embodiment. A molding compound is applied to the embodiment and metal coins are imbedded in the central opening.

Chips may be coded with materials which "illuminate" when placed under a fluorescent lamp. Also, a reactive paint may be placed on the chip which triggers an alarm system if the chip is moved into or past a monitored area.

Some chips which are made from the known manufacturing techniques (including the above) have several disadvantages, including counterfeiting. Although using fluorescent film and metallic paint may result in the disclosure of a counterfeit token and possible token theft, respectively, the application of these materials does little in the way of automatically identifying token information.

Other possibilities of gaining chip identification were considered while conducting research with respect to the present invention. Included here is a brief analysis, including disadvantages of each.

Using magnetics offers two approaches to identifying an object, involving storing information on a magnetic strip and retrieving the information using a magnetic reader head or embedding a magnet charged to a certain gauss level inside the chip.

Lasers may also be used to identify different chip systems. Bar coding can be placed either radially or in a straight line on the chip. This has the same types of problems as with the magnetic strip. A laser can be used to read a matrix system which employs a grid on the surface of the chip. This system is not used for sorting, but only to check for counterfeits.

Vision/optics may be used for inspecting a chip by comparing the actual chip to a stored image. This system can be fooled by an exact duplicate chip. Chips that have not been molded to a specific tolerance or dirty chips could be mistaken as counterfeit.

X-ray may be used in chip identification systems but this type of system is hazardous and would require protective shielding and therefore is not a good application.

In summary, prior art chips require more time consuming inspection to discern their value and authenticity than is desirable with the chip in accordance with the present invention. Using fluorescent coatings and metallic paints may become ineffective over time due to wear. Similarly, using magnetics, lasers, vision/optics, and x-ray devices present problems that are avoided by the present invention.

SUMMARY OF THE INVENTION

To overcome the deficiencies of existing gaming chips, it is a primary object of the invention to address each and every one of the above-mentioned concerns.

A second object of the invention is to provide a gaming chip with a permanently encapsulated insert displaying a message or design.

A third object is to protect the insert with a clear overlay disk that provides attractive depth to the displayed message or design.

A fourth object is to provide the clear overlay disk with an axially protruding peripheral rim that can be ground flush with the rest of the chip without scratching its recessed transparent face. A ground surface and recessed center produces excellent stackability.

A fifth object is to provide the clear overlay disk with radial tabs that engage corresponding notches along the interior of a brass ring. This provides rotational alignment between decorative features of the ring and a design or message on the back of the clear disk.

A sixth object is to provide a gaming chip that offers a wide variety of designs by way of a center insert that can be a message, design, hologram or electronic surveillance device.

A seventh object is to provide a composite gaming chip having a peripheral brass ring for strength, appearance and pleasing weight distribution and a plastic center to minimize cost and to protect and attractively display a center insert.

An eighth object is to bond a brass and plastic composite gaming chip with a dissimilar colored plastic for appearance and to prevent tampering.

A ninth object is to provide a composite gaming chip having a brass ring with protrusions that extend fully in both an axial and radial direction for strength and wear resistance at its extremities.

These and other objects of the invention are provided by a novel gaming chip assembly that includes a strong frame made of a brass ring with axial and radial protrusions and a central aperture with notches. A display, or otherwise functional insert, is sandwiched between two clear disks having tabs that engage the notches in the brass ring. The assembly is inserted into the cavity of a plastic injection mold where it is bonded together by an injected thermoplastic. A rim provides a recessed face on each disk which allows the composite chip to be ground flat without scratching the clear face.

DESCRIPTION OF THE PREFERRED EMBODIMENTS

Figure 1:
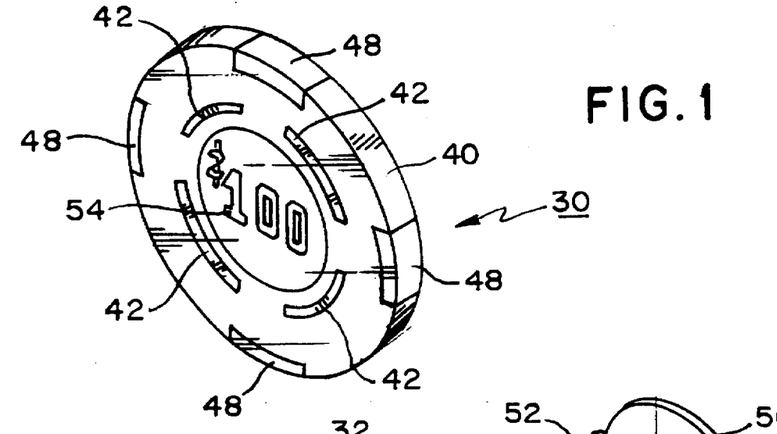
FIG. 1 is an isometric view of a completed composite gaming chip constructed according to one embodiment of the present invention.
Figure 2:
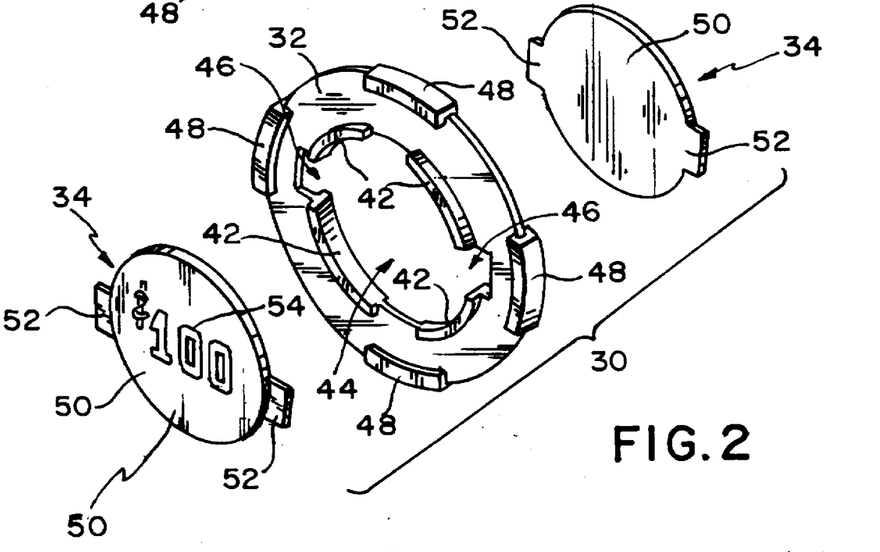
FIG. 2 is exploded isometric view of the basic elements of the chip of FIG. 1.
Figure 3:
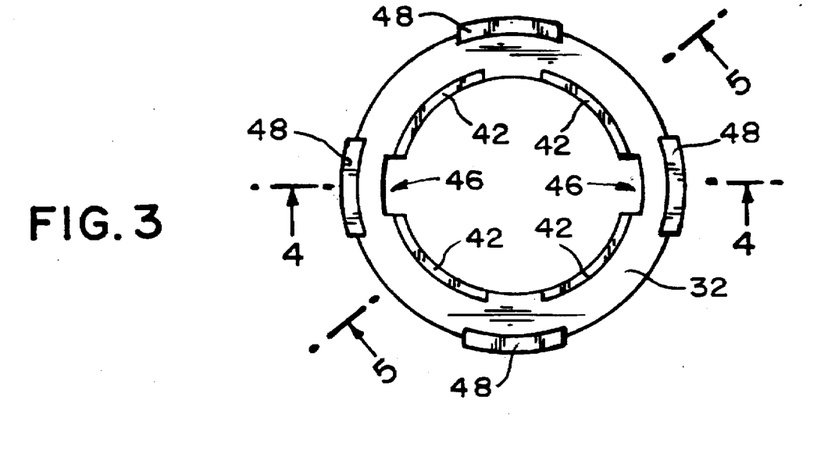
FIG. 3 is a top plan view of the metallic substrate of the chip of FIG. 1.
Figure 4:
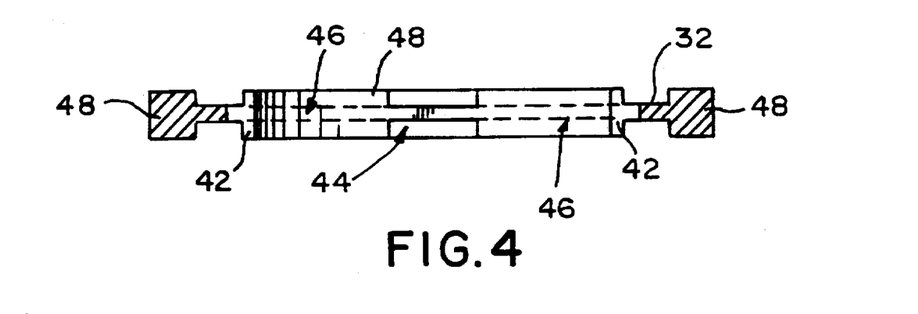
FIG. 4 is a side elevational view, in cross-section, taken along line "4—4" of FIG. 3.
Figure 5:
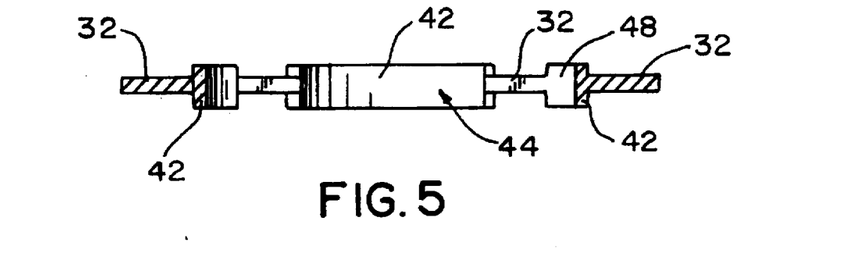
FIG. 5 is a side elevational view, in cross-section, taken along line "5—5" of FIG. 3.
Figure 6:
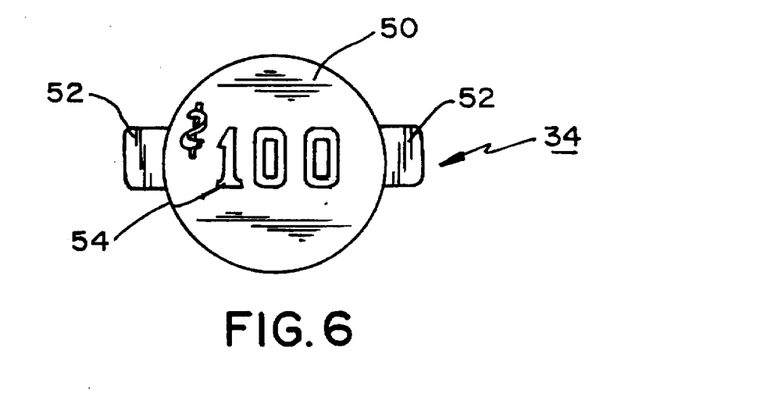
FIG. 6 is a top plan view of an insert of the chip of FIG. 1.
Figure 7:
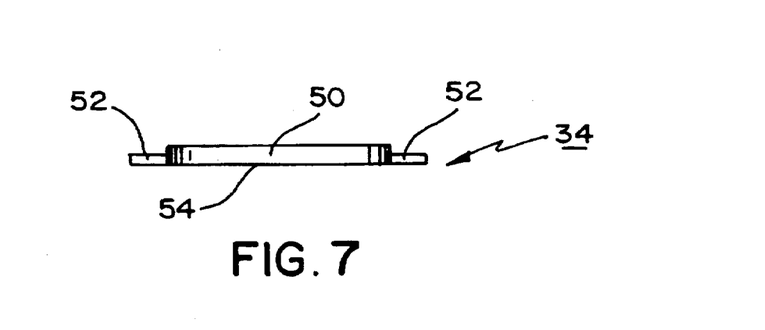
FIG. 7 is a side elevational view of the insert.
Figure 8:
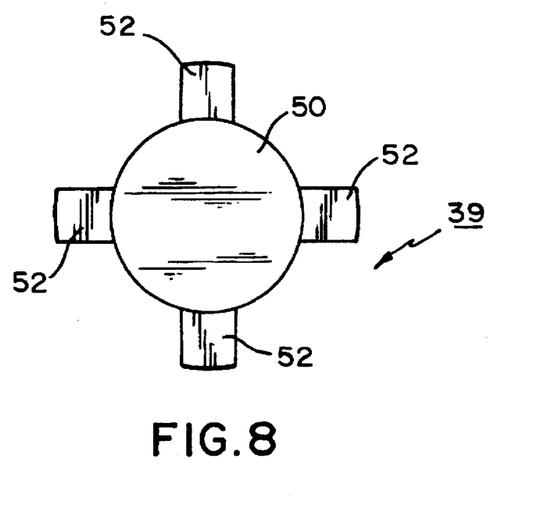
FIG. 8 and 10 are top plan views of an insert and a metallic substrate constructed according to another embodiment of the present invention.
Figure 9:
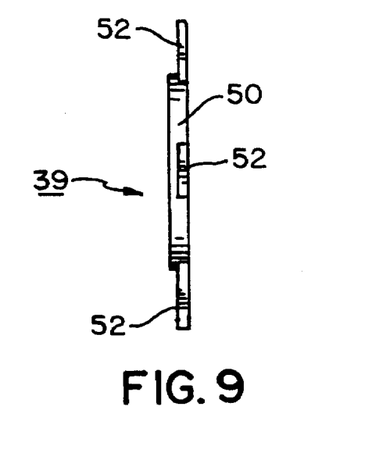
FIGS. 9 and 11 are side elevational views, respectively, the latter in cross-section and taken along line "11—11" of FIG. 10, of the insert and metallic substrate of FIGS. 8 and 10.
Figure 10:
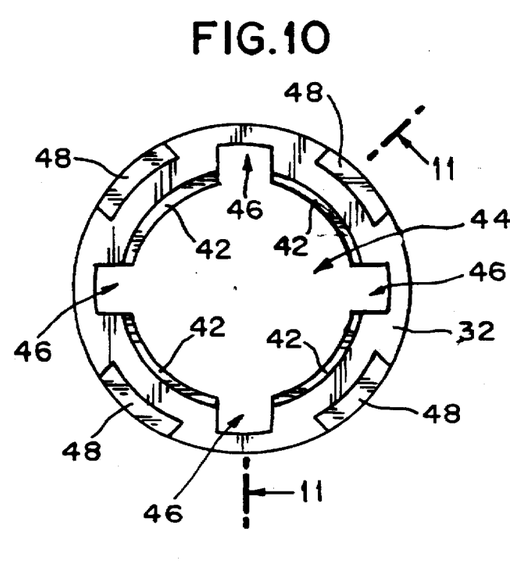
Figure 11:
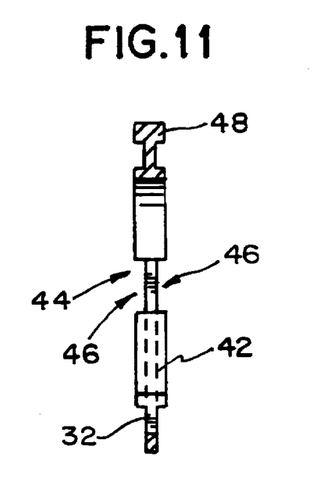
Figure 12:
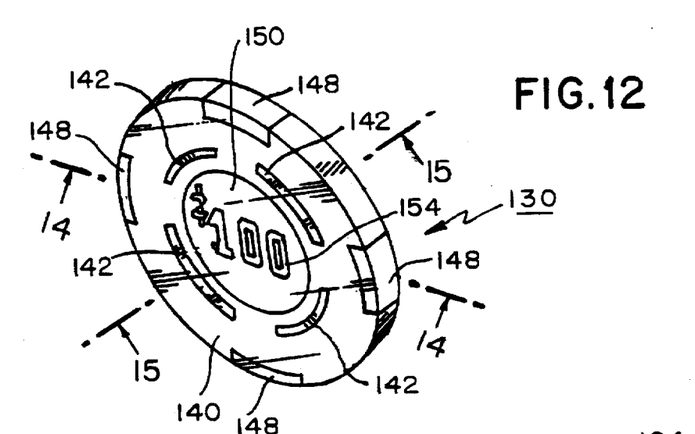
FIG. 12 is an isometric view of a gaming chip constructed according to another embodiment of the present invention.
Figure 13:
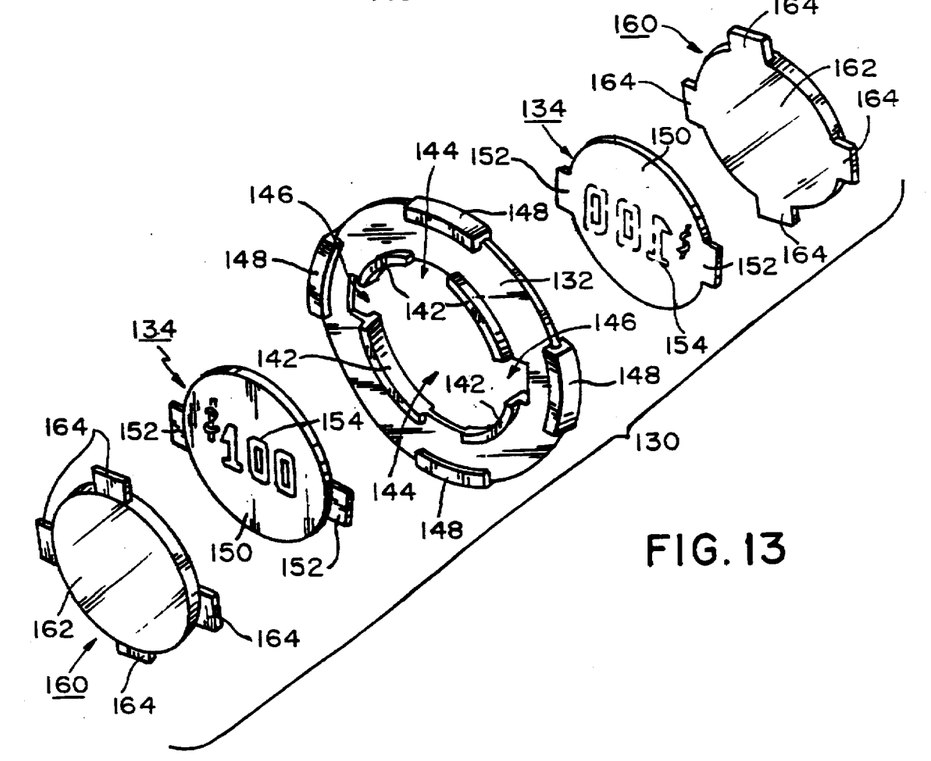
FIG. 13 is an exploded isometric view of the embodiment of FIG. 12.
Figure 14:
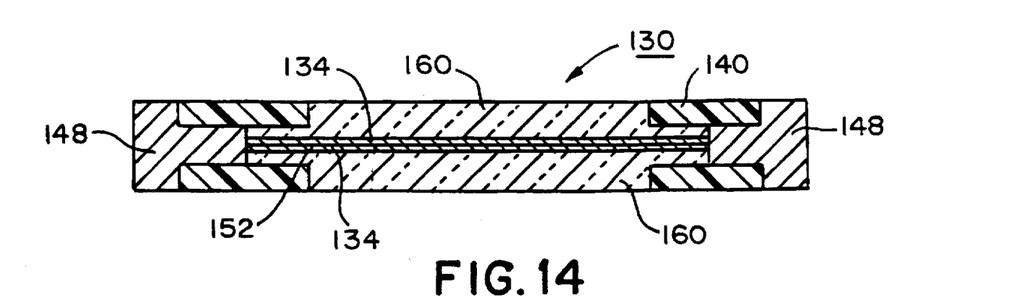
FIG. 14 is a side elevational view, in cross-section, taken along line "14—14" of FIG. 12.
Figure 15:
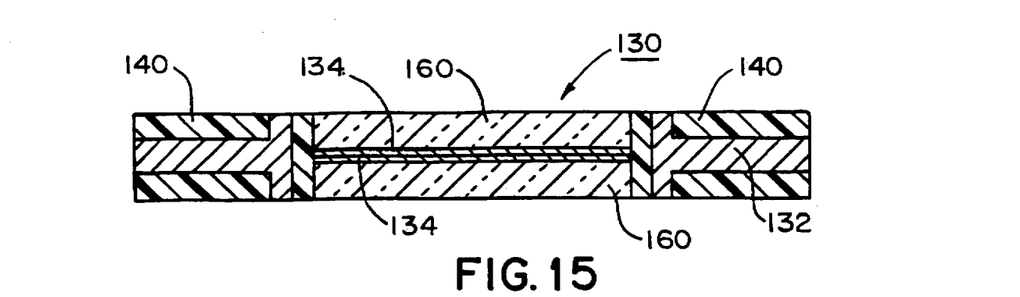
FIG. 15 is a side elevational view, in cross-section, taken along line "15—15" of FIG. 12.
Figure 16:
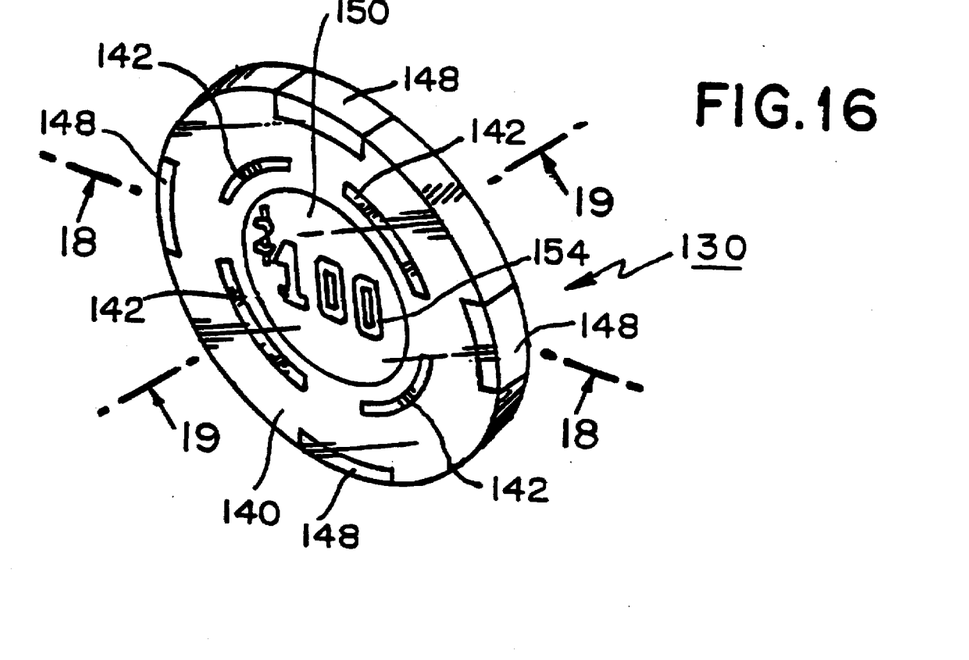
FIG. 16 is an isometric view of a variation of the gaming chip of FIG. 12.
Figure 17:
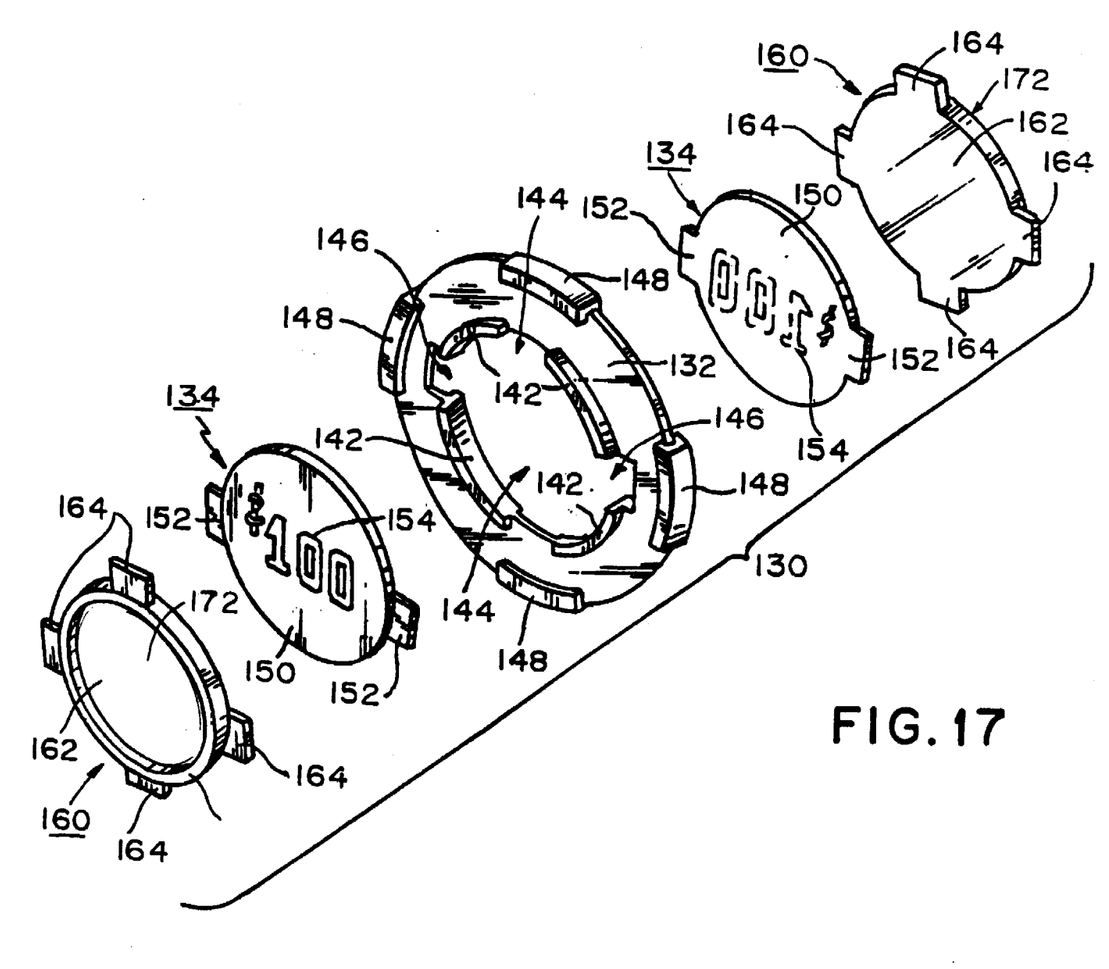
FIG. 17 is an exploded isometric view of the embodiment of FIG. 16.
Figure 18:
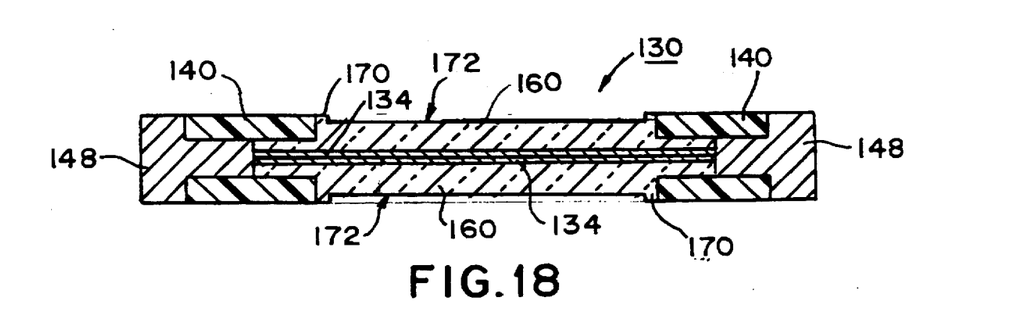
FIG. 18 is a side elevational view, in cross-section, taken along line "18—18" of FIG. 16.
Figure 19:
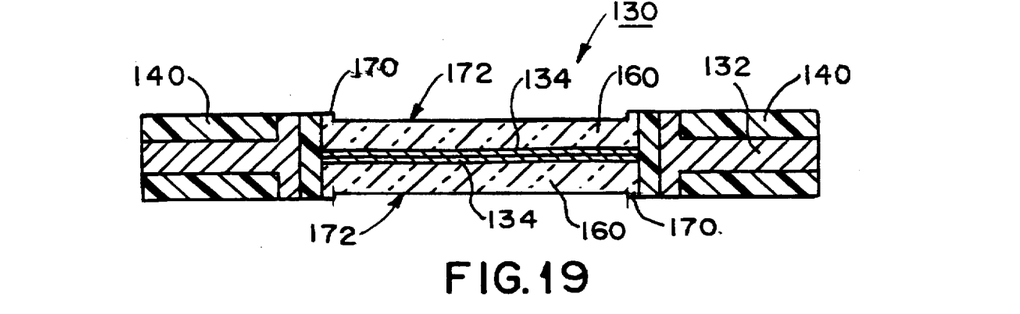
FIG. 19 is a side elevational view, in cross-section, taken along line "19—19" of FIG. 16.

Referring to FIGS. 1 and 2, a gaming chip, generally indicated by the reference numeral 30, includes a machined brass (or other copper alloy), generally annular ring substrate 32; two clear polycarbonate disks, generally indicated by the reference numeral 34; and a colored opaque thermoplastic polystyrene encasement 40. Ring 32 has several arcuate first (axial) protrusions 42 distributed around a central aperture 44 and rising orthogonally upwardly from each face of the ring. Two notches 46 are defined in the inner periphery of ring 32 spaced 180 degrees apart therein, each notch being disposed between two adjacent protrusions 42. Ring 32 further has several arcuate second (radial) protrusions 48 distributed around the outer periphery of the ring and rising orthogonally upwardly from each face of the ring.

Each of disks 34 includes a central, raised, circular portion 50, with two, tabs 52, thinner than the central portion, extending outwardly from the central portion, and having their rear surfaces flush with the rear surface of the central portion. Optical indicia 54, which may be a message, chip value, logo, and/or design elements are printed, hot stamped, or adhesively attached on the rear surface of central portion 50.

To assemble chip 30, disks 34 are inserted in central aperture 44 in ring 32, with tabs 52 of the disks engaging notches 46 in the ring. Then the assembly is placed in a mold and encasement 40 injected into the mold to fill the cavities between the solid elements of chip 30. As is seen on FIG. 1, the solid elements of chip 30 are dimensioned such that the finished chip is circular, with flat faces, with the edges and outer peripheries (outer surfaces) of protrusions 48 exposed, and with the edges (outer surfaces) of protrusions 42 exposed. It will be understood that encasement material 40 surrounds the central portions 50 of disks 34 and covers tabs 52 thereof, thus securely locking the disks in place. Since disks 34 are of transparent material, indicia 54 are visible through central portions 50 of the disks.

FIGS. 3–7 offer additional views of ring 32 and a disk 34.

FIGS. 8–11 illustrate alternative embodiments of ring 32 and disk 34. Here, ring 32 and disk 34 are generally constructed as described above with reference to FIGS. 1–7, except that ring 32 includes four notches 46 defined around the inner periphery of the ring and spaced 90 degrees apart. Similarly, disk 34 is provided with four tabs 52 spaced apart 90 degrees around the outer periphery thereof. It will be understood that two disks 34 illustrated on FIGS. 8 and 9 will be inserted into ring 32 illustrated on FIGS. 10 and 11, with tabs 52 engaging notches 46. That assembly will then be encapsulated with encasement 40 and the finished product will have the same appearance as chip 30 on FIG. 1.

FIGS. 12–15 illustrate a gaming chip constructed according to another embodiment of the present invention and generally indicated by the reference numeral 130. All elements of gaming chip 130 which are identical to, or nearly identical to, corresponding elements of chip 30 described above are given the same reference numerals as the elements of chip 30, with the addition of the prefix "1". It can be seen on FIG. 12 that the external appearance of chip 130 is identical to that of chip 30. However, there are differences in construction as described below with reference primarily to FIG. 13.

The elements of chip 130 common with the elements of chip 30 are identical, except for disks 134 which have central portions 150 thereof having thicknesses the same as the thickness of the tabs 152, such that the faces of the central portions are flush with the surfaces of the tabs. New elements are two, clear, polycarbonate covers, generally indicated by the reference numeral 160, similar to the four-tab construction of disk 34 on FIGS. 8 and 9. It will be seen that ring 132 is also of the four-tab construction, similar to ring 32 on FIGS. 10 and 11. Covers 160 each have a raised, circular, central portion 162 and four, outwardly extending tabs 164 spaced at 90 degree intervals around the outer periphery of the central portion.

Chip 130 is assembled by inserting disks 134 in central aperture 144, with tabs 152 engaging a pair of oppositely disposed notches 146. Then, covers 160 are inserted in central aperture 144, with tabs 164 engaging all four notches 146. Finally, the assembly is encapsulated with encasement 140, securing all the elements of chip 130 together. It can be seen from FIGS. 14 and 15 that the outer surfaces of covers 160 are flush with the faces of chip 130. Since covers 160 and disks 134 are clear, indicia 154 are visible.

FIGS. 16–19 illustrate a variation of the embodiment of the present invention shown on FIGS. 12–15. Here, central portions 162 of covers 160 include annular rings 170 surrounding circular depressed inner areas 172. Thus, in this embodiment, as seen best on FIGS. 18 and 19, the surfaces of inner areas 172 lie below the faces of chip 130.

It will be understood that chip 130 may also have covers 160 of two-tab construction.

Figure 20:
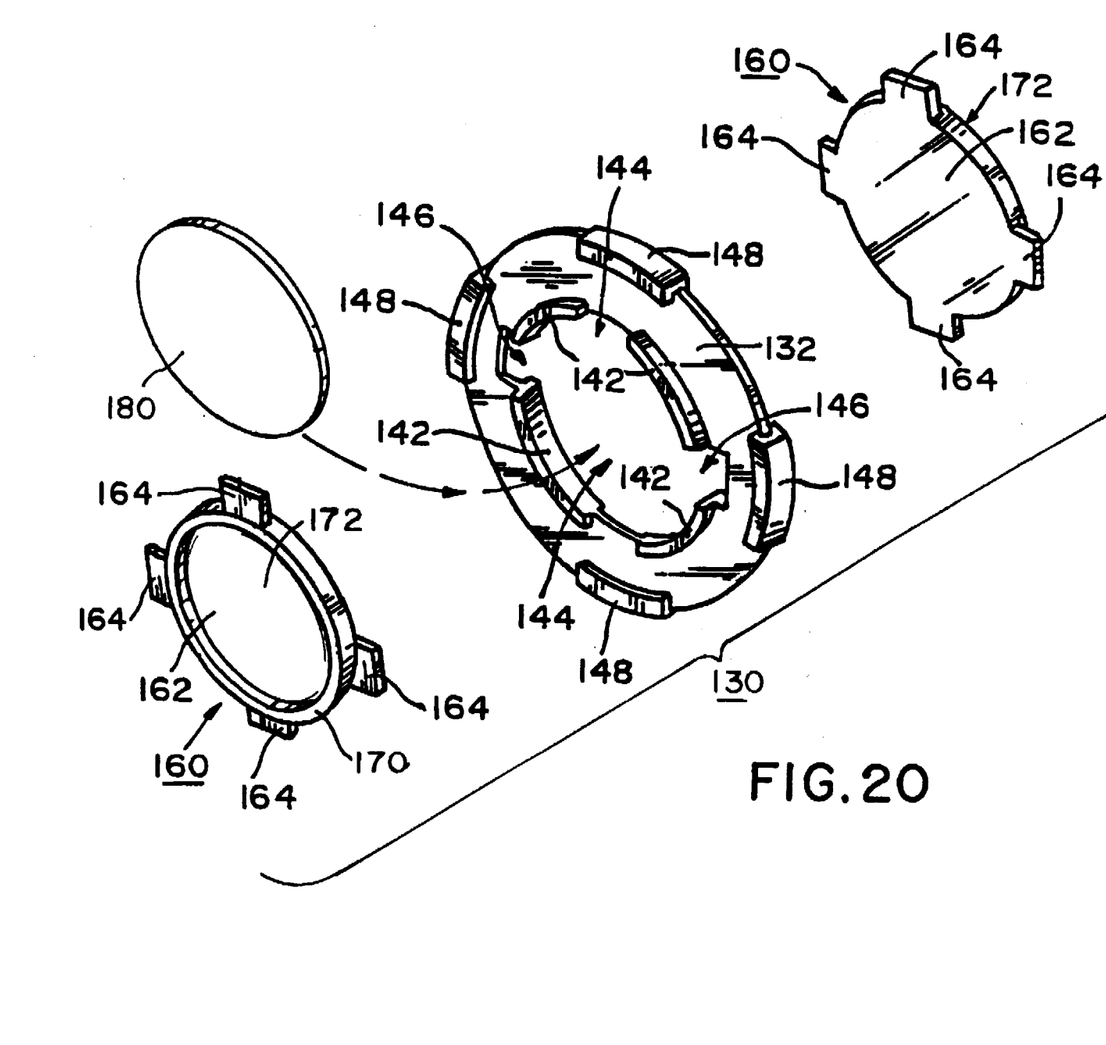
FIG. 20 is an exploded isometric view of another variation of the gaming chip of FIG. 12.

FIG. 20 illustrates another variation of chip 130. Here, chip 130 includes ring 132 and two covers 160, all as constructed above, and a single insert 180. Insert 180 schematically represents any item that can fit between covers 160. Examples of such an item include, but are not limited to, a label, a sticker, a hologram, and an embedded electronic circuit. Examples of such an electronic circuit include, but are not limited to, a transponder or an electronic article as disclosed in U.S. Pat. Nos. 4,660,025; 4,859,991; and 3,766,452, all of which are specifically incorporated by reference hereunto. In one embodiment of the present invention, insert 180 includes optical indicia 154 which are visible through covers 162. It will be understood that other types of inserts, such as inserts 160 may also be included in the embodiment illustrated on FIG. 20 together with insert 180. Insert 180 may also be provided with locating tabs, if desired.

Figure 21:
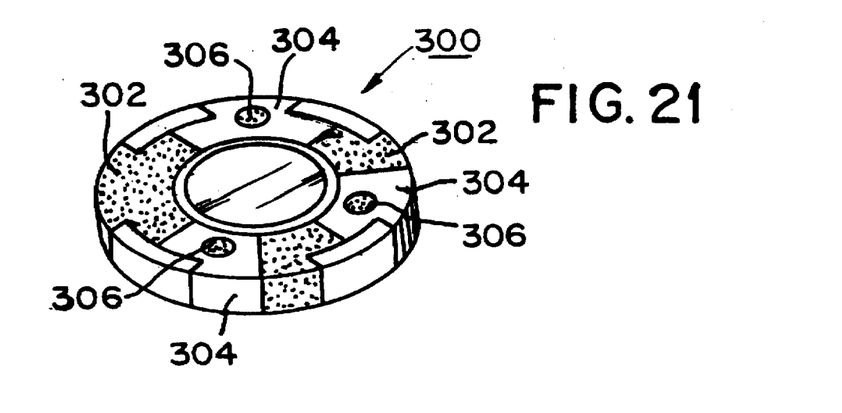
FIG. 21 is an isometric view of a gaming chip constructed according to a further embodiment of the present invention.

FIG. 21 illustrates a gaming chip, constructed according to a further embodiment of the present invention, and generally indicated by the reference numeral 300. In this embodiment, which may include elements of chip 130, the encasement material is provided in three different colors 302, 304, and 306 in a suitably constructed mold.

Disks 34 and 134 and covers 160 preferable have a higher melting point than the encasement material used.

In other embodiments of the present invention, the length, quantity, and circumferential positions of protrusions 42, 48, 142, and 148 are varied, providing a code that indicates a chip's value. With protrusions 48 and 148 being exposed along the outer periphery of chips 30 and 130, the value of a chip within a stacked set of chips is readily determined from a side view.

It should be noted that the design of gaming chips 30 and 130 is readily adapted to include radial as well as circumferential interlocking serrations that enhance the stackability of the chips.

Although the invention is described with reference to preferred embodiments, modifications thereto will be apparent to those skilled in the art. Therefore, the scope of the invention is to be determined by reference to the claims which follow.

What is claimed is:

1. A gaming chip comprising:
   a metal ring defining a central aperture, said metal ring having a plurality of axial protrusions and a plurality of radial protrusions, each having inner and outer surfaces; said radial protrusions defining an outer periphery of said metal ring, said metal ring defining a plurality of radial notches open to said central aperature;
   two cover disks each having a back face and a clear face, said two cover disks being situated in back-to-relationship with said central aperature;
   a plurality of tabs extending radially from each of said two cover disks for association with said plurality of radial notches so to align said two cover disks with said metal ring;
   a rim extending axially outward from said clear front face of said cover disks to define a central axial recess on said clear face of each of said two cover disks; and
   a thermoplastic material substantially encapsulating said metal ring and said two cover disks except for said clear front face, said outer surfaces of said axial protrusions and said outer surfaces of said plurality of radial protrusions which face away from said gaming chip.

2. The gaming chip of claim 1, further comprising an insert sandwiched between said two cover disks.

3. The gaming chip of claim 2, wherein said insert includes an element selected from at least one of a logo, a design, a message, a hologram, a slogan, a picture, a currency value, an alpha-numeric indicia, and combinations thereof, and is visible through said clear face.

4. The gaming chip of claim 1, wherein said gaming chip further includes an electrical integrated chip circuit.

5. The gaming chip of claim 2, wherein said insert is an electrical integrated chip circuit.

6. The gaming chip of claim 1, further comprising an alpha-numeric indicia message or logo disposed on said back that is visible through said clear face.

7. The gaming chip of claim 1, wherein said two cover disks have a higher melting temperature than said thermoplastic material.

8. The gaming chip of claim 1, wherein said rim of said two cover disks is substantially axially flush in height with said plurality of axial protrusions.

9. The gaming chip of claim 8, wherein said flush height is substantially the same for all said protrusions of said metal ring.

10. The gaming chip of claim 1, wherein said thermoplastic encapsulating material includes at least one of radial and circumferential serrations to enhance the stackability of said gaming chips.

11. A gaming chip comprising:

a metal ring having a central aperature and a plurality of axial protrusions and a plurality of radial protrusions, said radial protrusions defining an outer periphery of said metal ring, said metal ring further having a plurality of radial notches open to said central aperture;

an insert disposed within said central aperture;

two cover disks each having a back face and a clear front face, said two cover disks being situated in back-to-back relationship within said central aperture with said insert sandwiched therebetween;

a plurality of tabs extending radially outward from each of said two cover disks for association with said plurality of radial notches to rotationally align said cover disks with said metal ring;

a rim extending axially outward from said clear front face of each of said two cover disks to define a central axial recess on said clear front face of each of said two cover disks; and a thermoplastic material substantially encasing said metal ring and said two cover disks except for said outer surfaces of said axial protrusions and said plurality of radial protrusions which face away from said gaming chip.

12. The gaming chip of claim 11, wherein said insert includes at least one element selected from the group consisting of a logo, a design, a message, a hologram, a slogan, a picture, a currency value, an alpha-numeric indicia, an electrical integrated chip circuit, and combinations thereof.

13. The gaming chip of claim 11, wherein said two cover disks have a generally higher melting temperature than said thermoplastic material.

14. The gaming chip of claim 11, wherein said rim of each of said two cover disks is substantially axially flush in height with said plurality of axial protrusions.

15. The gaming chip of claim 14, wherein said flush height is substantially the same for all protrusions of said metal ring.

16. A gaming chip comprising:

a metallic ring consisting of a material selected from the group consisting of copper alloy and other metal alloy and defining a central aperture, said metal ring having a plurality of axial protrusions and a plurality of radial protrusions, said radial protrusions defining an outer periphery of said metal ring, said metal ring defining a plurality of radial notches open to said central aperture;

an insert disposed within said central aperture, and having at least a design and a message;

two cover disks consisting of transparent polycarbonate and each having front and back faces, said two cover disks being situated in back-to-back relationship within said central aperture with said insert sandwiched therebetween and visible through said faces;

a plurality of tabs extending radially outward from each of said two cover disks and into said plurality of radial notches so as to align said two cover disks with said metal ring;

a rim extending axially outward from said clear face of each of said two cover disks to define a central axial recess on said dear face of each of said two cover disks, said rim extending axially outward beyond said plurality of tabs; and an encapsulation consisting of an opaque thermoplastic material having a generally lower melting temperature than said two cover disks consisting of polycarbonate, said thermoplastic encapsulation substantially encasing said metal ring and said two cover disks except for said central axial recess and said outer surfaces of said axial protrusions which face away from said gaming chip.

17. The gaming chip of claim 16, wherein said rim of each of said two cover disks is substantially axially flush in height with said plurality of axial protrusions.

18. The gaming chip of claim 16, wherein said flush height is substantially the same for all protrusions of said metal ring.

19. The gaming chip of claim 16, wherein said thermoplastic material is a plastic material and wherein the color or colors of said material is indicative of the currency equivalent value of said gaming chip.

* * * * *